INVENTOR.
JOHN W. LAWS, Jr.

BY Charles W. Gregg

AGENT

Nov. 12, 1968 J. W. LAWS, JR 3,410,989
HEAT TRANSFER MEMBERS AND METHOD OF FABRICATION THEREOF
Filed Nov. 14, 1966 3 Sheets-Sheet 2

INVENTOR.
JOHN W. LAWS, Jr.
BY
Charles W. Gregg
AGENT

Nov. 12, 1968　　　J. W. LAWS, JR　　　3,410,989
HEAT TRANSFER MEMBERS AND METHOD OF FABRICATION THEREOF
Filed Nov. 14, 1966　　　　　　　　　　　　　　3 Sheets-Sheet 3

INVENTOR.
JOHN W. LAWS, Jr.
BY Charles W. Gregg
AGENT

United States Patent Office 3,410,989
Patented Nov. 12, 1968

3,410,989
HEAT TRANSFER MEMBERS AND METHOD OF FABRICATION THEREOF
John W. Laws, Jr., Corning, N.Y., assignor to Corning Glass Works, Corning, N.Y., a corporation of New York
Filed Nov. 14, 1966, Ser. No. 593,772
4 Claims. (Cl. 219—438)

ABSTRACT OF THE DISCLOSURE

A heat transfer member comprising a parent plate of a glass or glass-ceramic material and graphite heat distribution plate hermetically sealed in said parent plate with the planar surfaces of the graphite plate disposed parallel with the planar surfaces of the parent plate, the graphite plate preferably being formed of pyrolytic graphite.

---

The present invention relates to heat transfer members. More particularly, the present invention relates to members for transferring heat from heating elements to glass, glass-ceramic or ceramic materials. Still more specifically, the present invention relates to articles such as heat transfer members or cooking vessels formed of glass, glass-ceramic or ceramic materials and having a more even distribution of heat over the heat transmitting surfaces of such articles than heretofore provided in such articles, and to the method of fabrication of such isothermal articles.

It is well known, for example, that articles, such as heat transfer members or cooking vessels, formed of glass, glass-ceramic or ceramic materials, while having many advantages over similar articles formed of other materials, have the distinct disadvantage of low thermal conductivity. Such low thermal conductivity results in so-called "hot spots" on the heat transmitting surfaces of said articles when the articles are placed directly on the burners of a gas, electric or similar type stove, range, hot plate etc. Such hot spots occur on said heat transmitting surfaces at points thereon directly above the points on the lower surfaces of the articles which contact or are directly above the heating elements of the burners. It is, therefore, an object of the present invention to provide heat transfer members having improved heat transfer characteristics.

It is another object of the invention to provide improved heat transfer members which have a more even or an isothermal distribution of heat across the heat transfer surfaces of the articles.

It is a third object of the invention to provide cooking vessels formed of glass, glass-ceramic or ceramic materials and having improved isothermal heat transfer surfaces contacted by foods supplied to said vessels for cooking thereof.

It is another object of the present invention to provide a method of fabrication of heat transfer members which have improved heat transfer characteristics.

In accomplishing the above objects of the invention, heat transfer members formed of glass, glass-ceramic or ceramic materials are each provided with a graphite plate disposed below the heat transmitting surface of the member, each such plate preferably having anisotropic thermal properties and each extending in a plane parallel with the heat transmitting surface of the respective article.

Other objects and characteristic features of the invention will become apparent as the description proceeds.

In the drawings:

FIG. 1 comprises a graph including a series of curves illustrating improved heat transfer characteristics of heat transfer members embodying the invention;

Similar reference characters refer to similar parts in each of the figures of the drawings.

Figure 1:
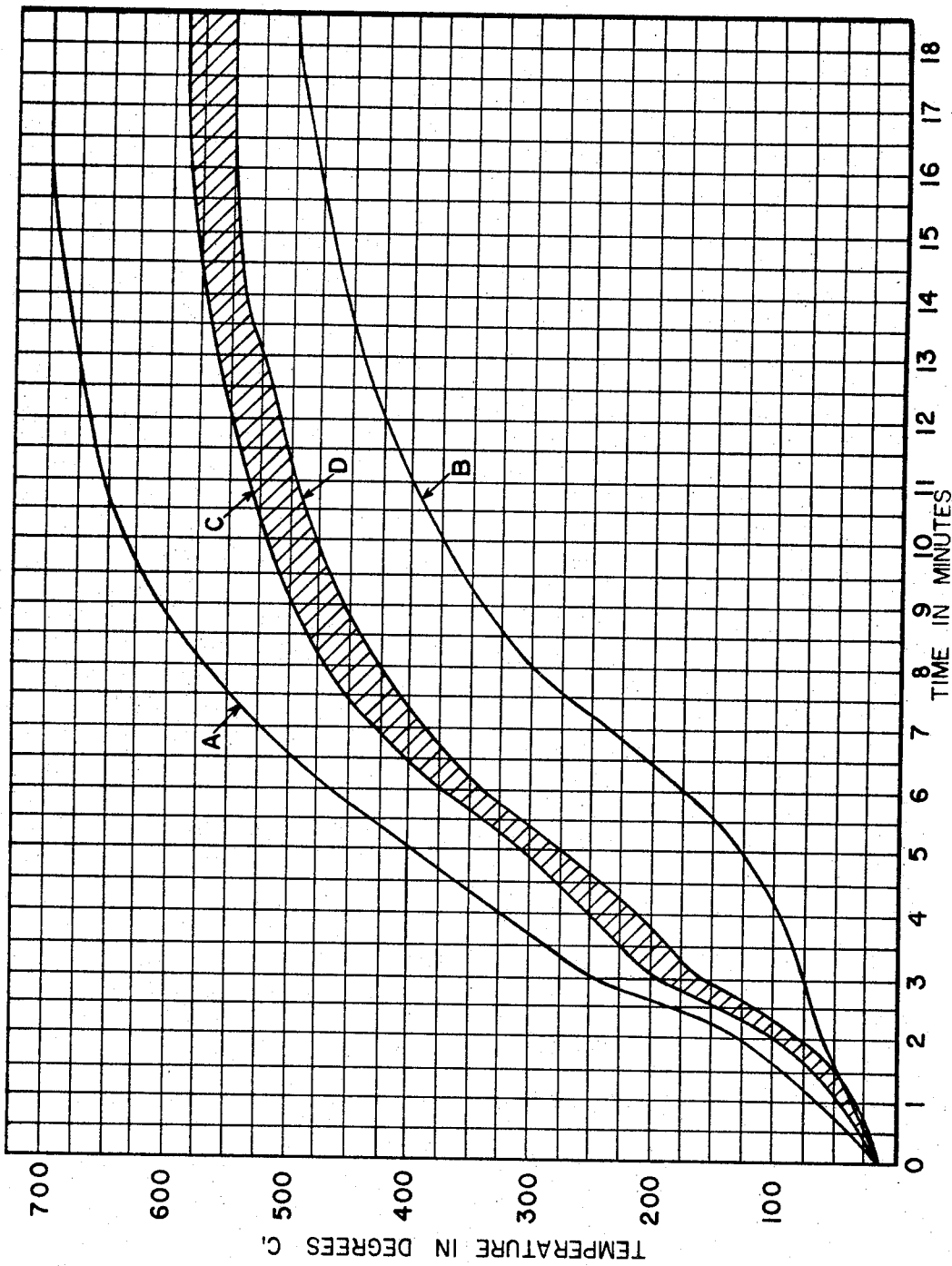

Referring first to FIG. 1 of the drawings, there is shown four curves designated A, B, C and D. Such curves represent temperatures measured by temperature probes at different points on the top surface of the top sheet of a pair of sheets of a glass-ceramic material with and without a graphite plate therebetween, the bottom sheet of said pair being placed on a 2050 watt electric range heating unit or burner. The glass-ceramic sheets were formed of Pyroceram® which is manufactured by Corning Glass Works, Corning, N.Y., and such sheets had a combined thickness of 0.125 inch. The graphite plate was formed of Grafoil® which is obtainable from High Temperature Materials Inc., Brighton, Mass., and such plate had a thickness of 0.070 inch.

Following the placing of said pair of glass-ceramic sheets on said heating unit without the graphite plate therebetween, the heating unit was energized and temperature measurements periodically made at randomly selected points on the top surface of the sheet of said pair of sheets. Curve A of the graph of FIG. 1 represents the temperatures of the hottest area detected on the surface of said top sheet at points in time up to 18 minutes following the energization or beginning of the heat-up of said heating unit, while curve B of the graph represents the temperature of the coldest area detected on said surface at points in time corresponding to those of curve A.

Thereafter the sheets and heating unit were permitted to cool to room temperature and the graphite plate was placed between the sheets. The heating unit was again energized and temperature measurements again periodically taken at said selected points and in a manner identical to that in which the first temperature measurements were taken. Curves C and D of the graph show the results of such temperature measurements, such curves corresponding to curves A and B, respectively, of the graph.

Randomly selecting a 200° C. reference temperature, it will be noted that, without the use of the graphite plate, the hottest area detected on the top surface of said top sheet reached such reference temperature in approximately 2.65 minutes (curve A of the graph) following the beginning of the heat-up of said heating unit. Similarly, without the use of the graphite plate, the coldest area detected on the top surface of said top sheet reached the 200° C. reference temperature in approximately 6.4 minutes (curve B of the graph) following the beginning of said heat-up of the heating unit. However, when said graphite plate was employed and the temperature measurements taken as mentioned above, the hottest area detected on the top surface of the top sheet reached the 200° C. reference temperature in approximately 3.1 minutes (curve C of graph) while the coldest area detected on said surface reached such reference temperature in approximately 3.8 minutes (curve D of graph).

Referring further to the curves shown in the graph of FIG. 1, it will be noted that, without employment of the graphite plate, when the coldest spot detected on the top glass-ceramic sheet reached 200° C. (curve B of graph), the hottest spot detected on such sheet was 500° C., that is, 300° higher (curve A of graph). However, using the graphite plate between the pair of glass-ceramic sheets, when the coldest spot detected on the top sheet of said pair of sheets reached 200° C. (curve D of graph) the hottest spot detected on the top sheet was only 35° C. higher, that is, had a temperature of approximately 235° C. (curve C of graph).

Briefly referring further to FIG. 1 of the drawings, the range of temperature differentials detected on the top surface of the top glass-ceramic sheet, when the graphite plate was used in conjunction with such sheets, is illustrated by the shaded area between curves C and D of the graph; while the range of temperature differentials detected on the top surface of the top glass-ceramic sheet, when the graphite plate was not employed between the glass-ceramic sheets, is shown by the area between curves A and B of the graph. It is readily apparent, therefore, that the employment of the graphite plate in the manner above discussed provides anisotropic heat transfer from the lower glass-ceramic plate to the upper glass-ceramic plate resulting in substantially isothermal characteristics of the upper surface of the upper glass-ceramic plate, that is, substantially equal heat distribution across the top surface of said upper plate.

Figure 2:
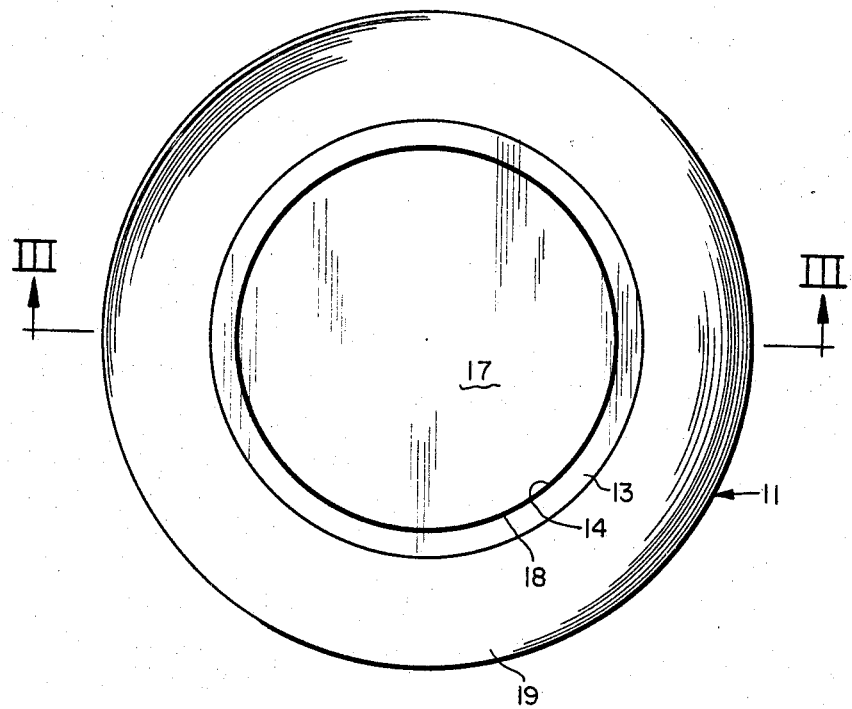
FIG. 2 is a bottom plan view of a cooking vessel embodying the invention.
Figure 3:
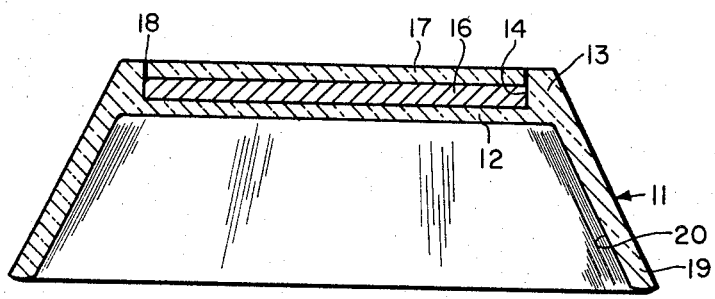
FIG. 3 is a sectional view of the cooking vessel of FIG. 2 taken substantially along line III—III of FIG. 2.

Referring to FIGS. 2 and 3 of the drawings, there is illustrated an article of a glass, glass-ceramic or ceramic material and embodying a heat transfer member in accordance with the invention. Such article is shown in such figures as a cooking vessel 11 having an integrant bottom plate 12 provided with an annular wall 13 of uniform height adjacent the outer periphery of such plate to provide a recess 14 having a relatively large planar area. A graphite plate 16, having a thickness less than the depth of recess 14 and a planar configuration corresponding to the configuration of the planar area of said recess, is disposed in such recess, as illustrated in FIG. 2 with one of its planar surfaces contacting a planar surface of plate 12. A second plate 17, of the same material as plate 12 having a planar configuration conforming to the planar area of recess 14 so as to fit snugly therein, is also disposed in such recess with one of its planar surfaces contacting the other planar surface of graphite plate 16. A high temperature resistant sealing material or cement 18 is provided between the outer periphery of plate 17 and the inner surface of annular wall 13, such cement being selected, in accordance with the characteristic of the material of which plates 12 and 17 are made, so as to provide a hermetic seal between plate 17 and said wall following curing and/or drying of the cement. Graphite plate 17 provides for anisotropic heat distribution within the heat transfer member.

The term cement as used herein is intended to include any high temperature resistant materials, such as a sealing glass frit etc., suitable for hermetic sealing, enclosing or encapsulation of parts. One cement which is suitable for such purposes is Astroceram B–LP cement obtainable from American Thermocatalytic Corp., 216 E. 2nd St., Mineola, N.Y.

It is pointed out at this time that wall 13 of plate 12 could be omitted and the wall 19 of vessel 11 considered as forming an annular wall, similar to wall 13, providing a recess 20 (FIG. 3) similar to recess 14, having a relatively large planar area. A graphite plate, similar to plate 16, could be disposed against the surface of plate 12 forming the bottom of vessel 11 and covered by another plate, similar to plate 17 and having a configuraton conforming to said surface of plate 12. A suitable cement, such as a sealing frit, could then be provided between the outer periphery of said other plate and the inner surface of wall 19 to hermetically seal the graphite plate within the bottom of vessel 11. Thus, a heat transfer member similar to that shown in FIG. 3 of the drawings may be fabricated.

It is further pointed out at this time that a heat transfer member similar to that shown in FIGS. 2 and 3 of the drawings can be fabricated by first forming an article, such as 11, from a molten glass or glass-ceramic material. Such an article can, for example, be press formed from a gob of said molten material, in the manner well known in the art, and then permitted to cool in its forming mold to below its softening temperature. A graphite plate, similar to plate 16, can then be disposed against a bottom surface of said article and said article then reheated to near its softening temperature. Another gob of said molten material and of a suitable volume may then be deposited on said graphite plate and formed, as by press forming, to provide a covering plate for the graphite plate, the molten material of such covering plate becoming fusion sealed with the material of said article to hermetically seal the graphite plate within the bottom of such article.

Figure 4:
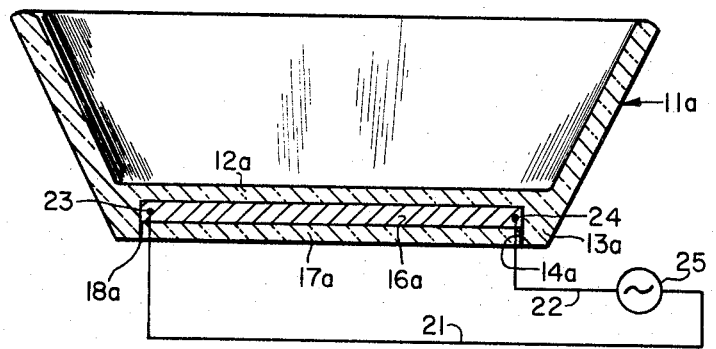
FIG. 4 is a view similar to FIG. 3 and illustrating a further embodiment of the invention.

There is shown in FIG. 4 of the drawings a heat transfer member shown as a cooking vessel 11a similar to vessel 11 shown in FIGS. 2 and 3 and having an integrant bottom plate 12a corresponding to bottom plate 12 of vessel 11. A pair of electrical leads 21 and 22 have first ends making electrical contact at points 23 and 24 with a graphite plate 16a hermetically sealed from atmosphere similarly to plate 16 of FIGS. 2 and 3. Points 23 and 24 of graphite plate 16a are each located adjacent the periphery of such plate and substantially opposite to each other across the planar expanse of the plate. The first ends of leads 21 and 22 are, similarly to graphite plate 16a, hermetically sealed from atmosphere, and the second ends of such leads are connected across a source 25 of electrical energy. By a suitable selection of the graphite material of which plate 16a is made, such plate provides an electrical resistance heating unit for the heat transfer member as well as providing anisotropic heat distribution within said member. Said source 25 of electrical energy is a source of a suitable type, voltage and capacity for proper energization of said heating unit so as to produce the desired amount of heat therefrom. Reference characters 13a, 14a, 17a and 18a designate parts of the heat transfer member of FIG. 4 which correspond to parts 13, 14, 17 and 18, respectively, of the heat transfer member of FIGS. 2 and 3, and no further discussion of such parts is, therefore, believed necessary.

Figure 5:
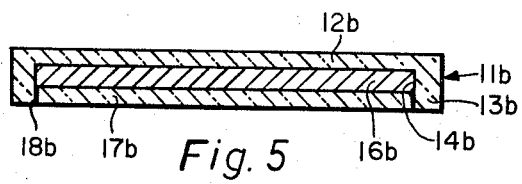
FIG. 5 is a cross-sectional view of a heat transfer member to be used an burners of stoves, ranges etc. for improved heat distribution.

FIG. 5 shows a simple form of a heat transfer member 11b embodying the invention. Such member may be employed, for example, on the top of a burner of an electric or gas range or cooking stove to provide for isothermal heat distribution across the bottom of cooking vessels, such vessels being disposed on the top surface of the heat transfer member. Member 11b comprises a plate 12b of a glass, glass-ceramic or ceramic material and having an annular wall 13b of uniform height adjacent the outer perphery of such plate to provide a recess 14b having a relatively large planar area. A graphite plate 16b, having a thickness less than the depth of recess 14b and a planar configuration corresponding to that of the planar area of said recess, is disposed in such recess with one of its planar surfaces contacting a planar surface of plate 12b. A second plate 17b, of the same material as plate 12b and having a planar configuration conforming to the planar area of recess 14b so as to fit snugly therein, is also disposed in such recess with one of its planar surfaces contacting the other planar surface of graphite plate 16b. A high temperature resistant cement 18b is provided between the outer periphery of plate 17b and the inner surface of annular wall 13b, such cement being selected, in accordance with the characteristics of the material of which plates 12b and 17b are made, so as to provide a hermetic seal between plate 17b and said wall following curing and/or drying of the cement.

In summarizing the features of the invention herein disclosed it is pointed out that when a heat transfer member such as that disclosed herein is used in conjunction with a burner of a gas or electric kitchen range or cooking stove, the areas of the surface of the lower plate of said member contacting the coils of said burner or directly above the gas outlet orifices of said burner transmit or conduct the heat vertically upwards to said graphite plate, there being negligible distribution of the heat through the horizontal planes of said lower plate. However, the graphite plate has superior heat conductivity properties and distributes the received heat through its horizontal planes thereby substantially evenly distributing such heat across the lower surface of the top plate of the heat transfer member. Such evenly distributed heat is then transmitted or conducted vertically upwards by said top plate to its top surface and a substantially even or isothermal distribution of heat occurs across said top surface to be supplied to food contacting such surface or be supplied across the bottom surface of a cooking vessel disposed on such top surface. If, as in the preferred embodiment of the invention, the graphite plate is made of a pyrolytic graphite, the anisotropic heat distribution properties of such plate, which provide for heat conductivity in the horizontal plates of the plate greatly superior to the heat conductivity in the vertical planes of the plate, assure near optimum isothermal heat distribution by the heat transfer member.

Furthermore, graphite is a relatively inexpensive material which is readily obtainable, and numerous types having a relatively low coefficient of expansion range, combined with high thermal conductivity characteristics, are available. The relatively low coefficient of expansion characteristics combined with the high thermal conductivity properties makes graphite extremely suitable for use for the purposes described herein. In addition, the electrical resistance properties of some types of graphite makes such materials suitable for use as electrical resistance heating units as described herein, as well as for providing for improved distribution of heat in the heat transfer members disclosed.

Although there is herein shown and described only a few forms of heat transfer members embodying the invention and methods for fabrication of such members, it will be understood that various changes and modifications may be made therein within the scope of the appended claims without departing from the spirit and scope thereof.

What is claimed is:

1. As an article of manufacture, a heat transfer member comprising, a first plate of a material selected from the group of materials comprising glasses, glass-ceramics and ceramics, one of the planar surfaces of such plate having an annular wall of uniform height adjacent the outer periphery of the plate to provide a recess having a relatively large planar area; a graphite plate having a planar configuration corresponding to that of the planar area of said recess and disposed therein, such plate having a thickness less than the depth of said recess; a second plate of said material disposed in said recess and having a planar configuration conforming to that of the planar area of said recess so as to fit snugly therein; and a high temperature resistant cement provided between the outer periphery of said second plate and the inner surface of said annular wall, such cement being selected in accordance with the characteristics of said material so as to provide hermetic sealing of said recess from atmosphere.

2. A member in accordance with claim 1 in which said first plate is the integral bottom wall of a glass-ceramic cooking vessel and said one planar surface is one of the surfaces of such bottom wall.

3. A member in accordance with claim 1 in which said graphite plate is formed of pyrolytic graphite.

4. A member in accordance with claim 1 and further including first and second electrical leads having first ends making electrical contact with said graphite plate at first and second points, respectively, adjacent the periphery of said plate, such points being substantially opposite to each other across the planar expanse of the graphite plate and hermetically sealed from atmosphere by said second plate and said cement, said graphite plate being selected so as to provide an electrical resistance heating unit for said member, and the second ends of said leads hermetically extending externally of said recess for connection to opposite terminals of a source of electrical current suitable for energizing said heating unit.

References Cited

UNITED STATES PATENTS

| 1,528,388 | 3/1925 | Speirs | 338—224 |
| 2,388,242 | 11/1945 | Arndt | 65—155 XR |
| 3,141,090 | 7/1964 | Batcher | 219—438 |
| 3,325,586 | 6/1967 | Suddick | 65—155 |

BERNARD A. GILHEANY, *Primary Examiner.*

H. B. GILSON, *Assistant Examiner.*